US011023580B1

(12) United States Patent
Han et al.

(10) Patent No.: US 11,023,580 B1
(45) Date of Patent: Jun. 1, 2021

(54) SYSTEMS AND METHODS FOR CROSS-PRODUCT MALWARE CATEGORIZATION

(71) Applicant: Symantec Corporation, Mountain View, CA (US)

(72) Inventors: Yufei Han, Biot (FR); Yun Shen, Reading (GB)

(73) Assignee: NortonLifeLock Inc., Tempe, AZ (US)

( * ) Notice: Subject to any disclaimer, the term of this patent is extended or adjusted under 35 U.S.C. 154(b) by 331 days.

(21) Appl. No.: 15/928,067

(22) Filed: Mar. 21, 2018

(51) Int. Cl.
G06F 21/56 (2013.01)
G06N 3/08 (2006.01)

(52) U.S. Cl.
CPC .......... *G06F 21/562* (2013.01); *G06F 21/568* (2013.01); *G06F 2221/033* (2013.01); *G06N 3/08* (2013.01)

(58) Field of Classification Search
CPC .................. G06F 21/562; G06F 21/568; G06F 2221/033; G06N 3/08
See application file for complete search history.

(56) References Cited

U.S. PATENT DOCUMENTS

| 8,401,982 | B1 * | 3/2013 | Satish | G06N 20/00 706/20 |
| 8,413,244 | B1 * | 4/2013 | Nachenberg | G06F 21/565 726/23 |
| 10,395,182 | B2 * | 8/2019 | Wang | G06F 21/6254 |
| 10,529,320 | B2 * | 1/2020 | Shafran | G10L 15/16 |
| 10,671,917 | B1 * | 6/2020 | Bhattacharyya | G06F 17/16 |
| 2008/0013821 | A1 * | 1/2008 | Macgregor | G05B 19/41875 382/141 |
| 2014/0201208 | A1 * | 7/2014 | Satish | G06F 21/564 707/737 |
| 2016/0026925 | A1 * | 1/2016 | Bouchard | G06F 16/00 706/12 |
| 2016/0292538 | A1 * | 10/2016 | Hwang | G06K 9/6286 |
| 2017/0184426 | A1 * | 6/2017 | Geiger | G01D 5/35358 |
| 2018/0150572 | A1 * | 5/2018 | Yates | G06Q 50/01 |
| 2019/0018838 | A1 * | 1/2019 | Wu | G06N 3/0454 |

OTHER PUBLICATIONS

Goldberg et al., Transduction with Matrix Completion—Three Birds with One Stone, 2009 (Goldberg) (Year: 2009).*
Liu et al., Cost-Sensitive Feature Selection by Optimizing F-Measures, 2017 (Liu) (Year: 2017).*
Recht et al., Parallel Stochastic Gradient Algorithms for Large-Scale Matrix Completion, 2011 (Recgt) (Year: 2011).*
Sainath et al., Low-Rank Matrix Factorization for Deep Neural Network Training with High-Dimensional Output Target, 2013 (Sainath) (Year: 2013).*
NPL Search (Google Scholar) (Year: 2021).*

* cited by examiner

*Primary Examiner* — Mahfuzur Rahman
*Assistant Examiner* — Richard W Cruz-Franqui
(74) *Attorney, Agent, or Firm* — FisherBroyles, LLP

(57) ABSTRACT

The disclosed computer-implemented method for cross-product malware categorization may include accessing computer readable media storing an incomplete feature dataset and an incomplete label dataset, determining a correlation between the plurality of features and the plurality of malware labels, and constructing at least one of a complete feature dataset based on the incomplete feature dataset and the correlation and a complete label dataset based on the incomplete label dataset and the correlation. Various other methods, systems, and computer-readable media are also disclosed.

20 Claims, 9 Drawing Sheets

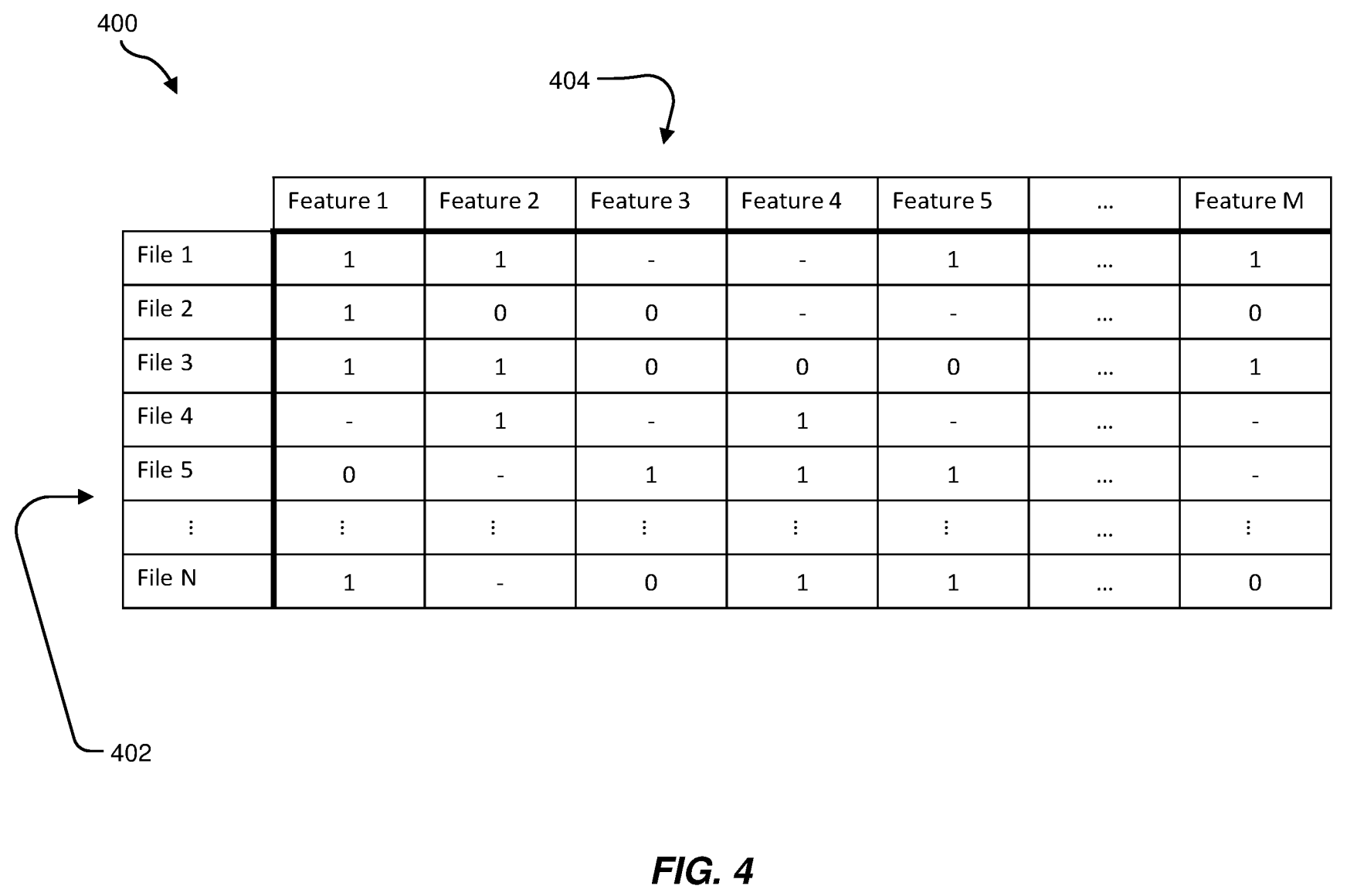

| | Feature 1 | Feature 2 | Feature 3 | Feature 4 | Feature 5 | ... | Feature M |
|---|---|---|---|---|---|---|---|
| File 1 | 1 | 1 | - | - | 1 | ... | 1 |
| File 2 | 1 | 0 | 0 | - | - | ... | 0 |
| File 3 | 1 | 1 | 0 | 0 | 0 | ... | 1 |
| File 4 | - | 1 | - | 1 | - | ... | - |
| File 5 | 0 | - | 1 | 1 | 1 | ... | - |
| ... | ... | ... | ... | ... | ... | ... | ... |
| File N | 1 | - | 0 | 1 | 1 | ... | 0 |

*FIG. 4*

SYSTEMS AND METHODS FOR CROSS-PRODUCT MALWARE CATEGORIZATION

BACKGROUND

Malware, short for malicious software, is software having a malicious intent and includes computer viruses, worms, Trojan horses, spyware, adware, and other harmful programs. Such software is harmful to a computer system and considerable effort has been made into developing methods and systems for identifying malware to prevent it from being executed on a system. In many automated malware categorization systems, a machine learning classifier is trained on a predefined set of features extracted from binaries. For example, n-grams of code segments and names of called functions may be used as features to train such a machine learning classifier. This trained machine learning classifier is then later reused to predict future security threats (i.e., classify if a newly appeared binary is (likely) malicious or not).

The output of malware categorization may be formulated as a multi-class problem. First, a file is identified as benign or malicious. Second, for detected malicious files, the files are further classified into specific types of malware families. Different malware detection products may report different malware families given the same file, since they make decisions with different signatures and/or different family grouping criteria, etc. The instant disclosure, therefore, identifies and addresses a need for systems and methods for cross-product malware categorization using results of different malware detection products.

SUMMARY

As will be described in greater detail below, the instant disclosure describes various systems and methods for cross-product malware categorization. In one example, a computer-implemented method for cross-product malware categorization may include (1) accessing, by one or more computing devices, computer readable media storing an incomplete feature dataset and an incomplete label dataset, (2) determining, by the one or more computing devices, a correlation between the plurality of features and the plurality of malware labels, and (3) constructing, by the one or more computing devices, at least one of a complete feature dataset based on the incomplete feature dataset and the correlation and a complete label dataset based on the incomplete label dataset and the correlation. The incomplete feature dataset includes a plurality of features corresponding to a plurality of possible malware files and the label dataset includes a plurality of malware labels corresponding to the plurality of possible malware files.

In some examples, the features include at least one of telemetry features, n-gram of a code segment, and names of call functions.

In one embodiment, the computer-implemented method further includes deriving, by the one or more computing devices, a labeling model based on the correlation with the labeling model configured to label new possible malware files.

In one embodiment, the computer implemented method further includes receiving, by the one or more computing devices, a set of features of a possible malware file and labeling the possible malware file with the labeling model.

In some examples, the incomplete feature dataset is characterized as a feature matrix of N by M dimensions, the N dimension representing files and the M dimension representing features of the files, and wherein the incomplete label dataset is characterized as a label matrix of N by L dimensions, the L dimension representing the malware labels.

In one embodiment, the computer implemented method further includes deriving, by the one or more computing devices, a linear projection of the M dimensional features to obtain a projected feature matrix and deriving, by the computing device, a linear projection of the L dimensional labels to obtain a projected label matrix. The correlation between the plurality of features and the plurality of malware labels may include a correlation between the projected feature matrix and the projected label matrix.

In one embodiment, the computer implemented method further includes jointly reducing, by the one or more computing devices, a loss function associated with the projected feature matrix, the projected label matrix, and the correlation between the projected features matrix and the projected label matrix.

In one embodiment, the computer implemented method further includes performing, by the one or more computing devices, a low-rank matrix factorization of the feature matrix to derive the linear projection of the M dimensional features.

In some examples, the low-rank matrix factorization is a least squares estimate.

In one embodiment, the computer implemented method further includes performing, by the one or more computing devices, a low-rank matrix factorization of the label matrix to derive the linear projection of the L dimensional labels.

In some examples, the matrix factorization is a cost sensitive matrix factorization suppressing an impact of unlabeled entries in the label matrix.

In one embodiment, the computer implemented method further includes enforcing, by the one or more computing devices, a discriminative constraint to determine the correlation between the projected feature matrix and the projected label matrix.

In one embodiment, the computer implemented method further includes approximating, by the one or more computing devices, a functional mapping between the projected feature matrix and the projected label matrix using linear regressors, random forest regressors, or neural networks.

In one embodiment, a system for cross-product malware categorization may include (1) one or more computing devices comprising at least one processor and (2) computer readable media storing an incomplete feature dataset and an incomplete label dataset with the incomplete feature dataset including a plurality of features corresponding to a plurality of possible malware files and the label dataset including a plurality of malware labels corresponding to the plurality of possible malware files with the computer readable media having instructions stored thereon that when performed by the at least one processor cause the one or computing devices to determine a correlation between the plurality of features and the plurality of labels and construct at least one of a complete feature dataset based on the feature dataset and the correlation and a complete label dataset based on the label dataset and the correlation.

In one embodiment, the instructions further cause the one or more computing devices to derive a labeling model based on the correlation, the labeling model configured to label new possible malware files.

In one embodiment, the instructions further cause the one or more computing devices to label the possible malware file with the labeling model based on a set of features of the possible malware file.

In some examples, the above-described method may be encoded as computer-readable instructions on a non-transitory computer-readable medium. For example, a computer-readable medium may include one or more computer-executable instructions that, when executed by at least one processor of one or more computing devices, may cause the one or more computing devices to (1) access computer readable media storing an incomplete feature dataset and an incomplete label dataset, (2) determine a correlation between the plurality of features and the plurality of malware labels, and (3) construct at least one of a complete feature dataset based on the incomplete feature dataset and the correlation and a complete label dataset based on the incomplete label dataset and the correlation.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 4 is an example of a feature dataset characterized as a matrix.

Figure 1:
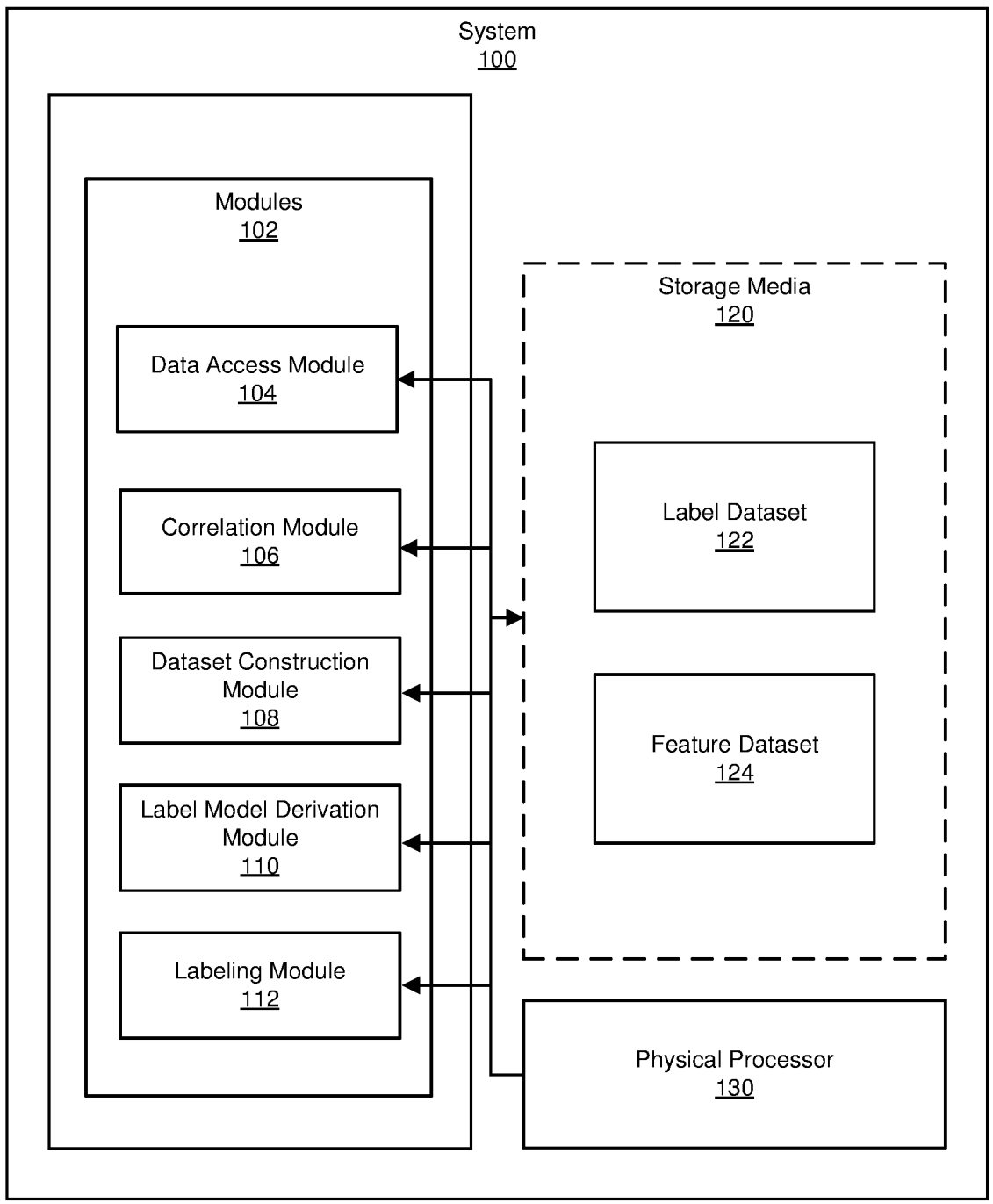
FIG. 1 is a block diagram of an example system for cross-product malware categorization.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for cross-product malware categorization. The disclosed subject matter may be implemented to predict features and labels for possible malware files. In some examples, the disclosed subject matter may be used to build a model for predicting the labels of possible malware files leveraging incomplete datasets of features and labels. Although many malware detection systems are unable to fully detect all of the features of a malware file and have not previously labeled every potential malware file, the disclosed subject matter is able to predict malware files in previously unlabeled files.

Figure 2:
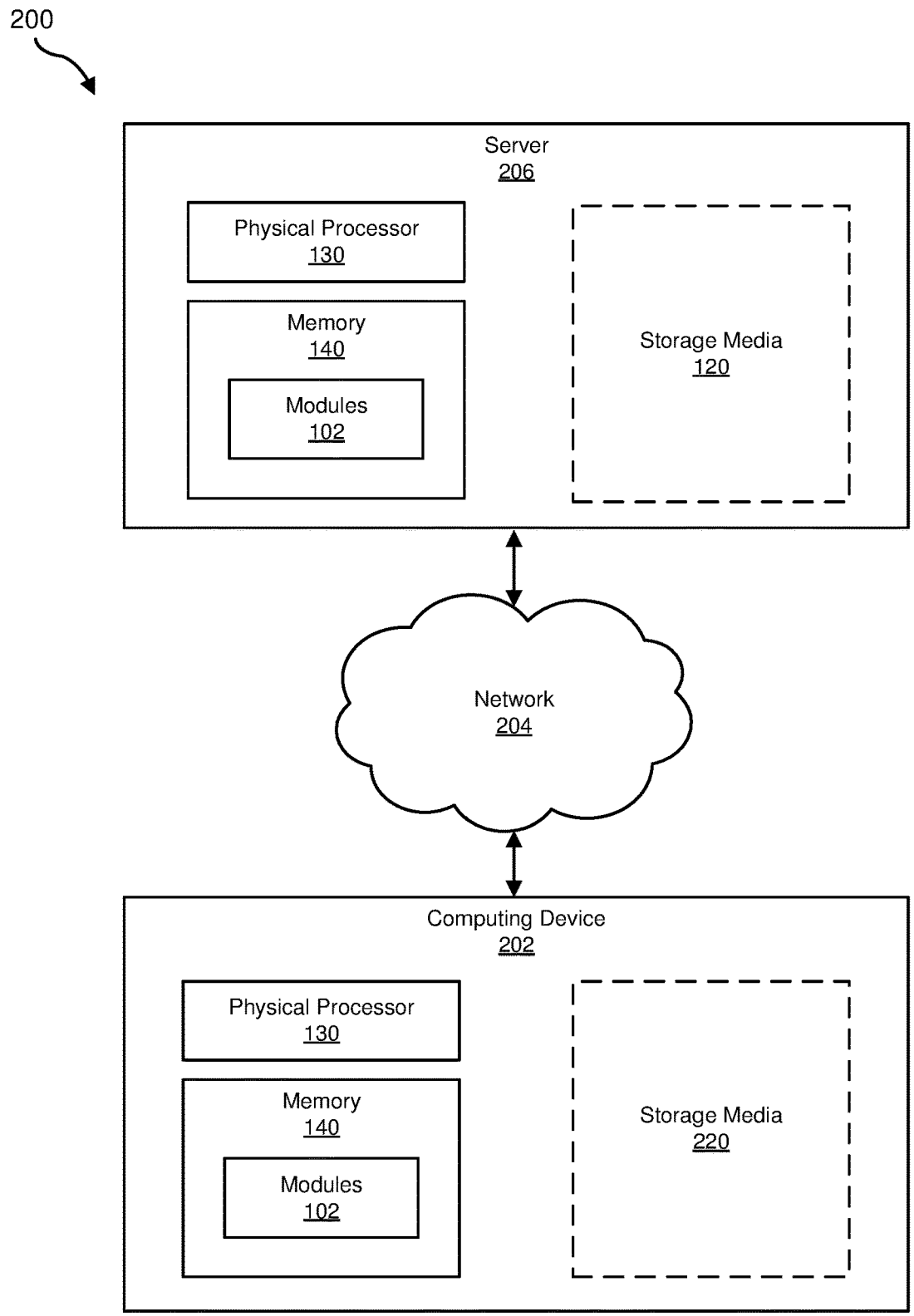
FIG. 2 is a block diagram of an additional example system for cross-product malware categorization.

The following will provide, with reference to FIGS. 1-2, detailed descriptions of example systems for cross-product malware categorization. Detailed descriptions of corresponding computer-implemented methods will also be provided in connection with FIGS. 3-7. In addition, detailed descriptions of an example computing system and network architecture capable of implementing one or more of the embodiments described herein will be provided in connection with FIGS. 8 and 9, respectively.

FIG. 1 is a block diagram of an example system 100 for cross-product malware categorization. As illustrated in this figure, example system 100 may include one or more modules 102 for performing one or more tasks. As will be explained in greater detail below, modules 102 may include a correlation module 104, a dataset construction module 106, a label model derivation module, and a labeling module. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate cross-product malware categorization. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include storage media 120 for storing data. Storage media 120 generally includes, without limitation, Random Access Memory (RAM), Read Only Memory (ROM), flash memory, Hard Disk Drives (HDDs), Solid-State Drives (SSDs), optical disk drives, caches, variations, or combinations of one or more of the same, and/or any other suitable storage memory suitable for storing data. A label dataset 122 and a feature dataset 124 are stored within storage media 120.

In one example, feature dataset includes a plurality of features corresponding to a plurality of possible malware files. The feature dataset may further include a relational mapping between the plurality of features and the plurality of possible malware files. In some examples, the feature dataset may be incomplete for at least one possible malware file, such that no relationship exists between at least one possible malware file and at least one feature. The features include potentially identifying characteristics of files and, in some examples, include telemetry features, n-grams of code segments, and an identification of functions called by the possible malware file. For instance, a possible malware file may have an entry in the feature dataset indicating an Internet Protocol address that the malware file communicates with, at least one significant sequence of bits of the possible malware file, and/or the name of a particular function called by the possible malware file.

In one example, label dataset 122 includes a plurality of labels corresponding to the plurality of possible malware files. Label dataset 122 may further include a functional mapping between the plurality of labels and the plurality of possible malware files. In some examples, label dataset 122 may be incomplete for at least one possible malware file, such that no relationship exists between at least one possible malware file and at least one label. In some examples the labels include labels previously applied to the potential malware files by one or more malware detection systems. For example, a first malware detection system may have identified a possible malware file as low risk, a second malware detection system as a high risk, a third malware detection system as no risk, and a fourth malware detection system may not have assigned any label.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to categorize malware across different identification products. For example, and as will be described in greater detail below, one or more of modules 102 may cause computing device 202 and/or server 206 to (1) access computer readable media 120 and/or 220 storing an incomplete feature dataset and an incomplete label dataset, (2) determine a correlation between the plurality of features of the incomplete feature dataset and the plurality of malware labels of the incomplete label dataset, and (3) construct at least one of a complete feature dataset based on the incomplete feature dataset and the correlation and a complete label dataset based on the incomplete label dataset and the correlation.

Computing device 202 generally represents any type or form of computing device capable of reading computer-executable instructions. In one example, computing device 202 is a general purpose personal computer. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of storing data representing potential malware files, features of malware files, labels of malware files, and relationships between the potential malware files, features of the malware files, and the labels of the malware files. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
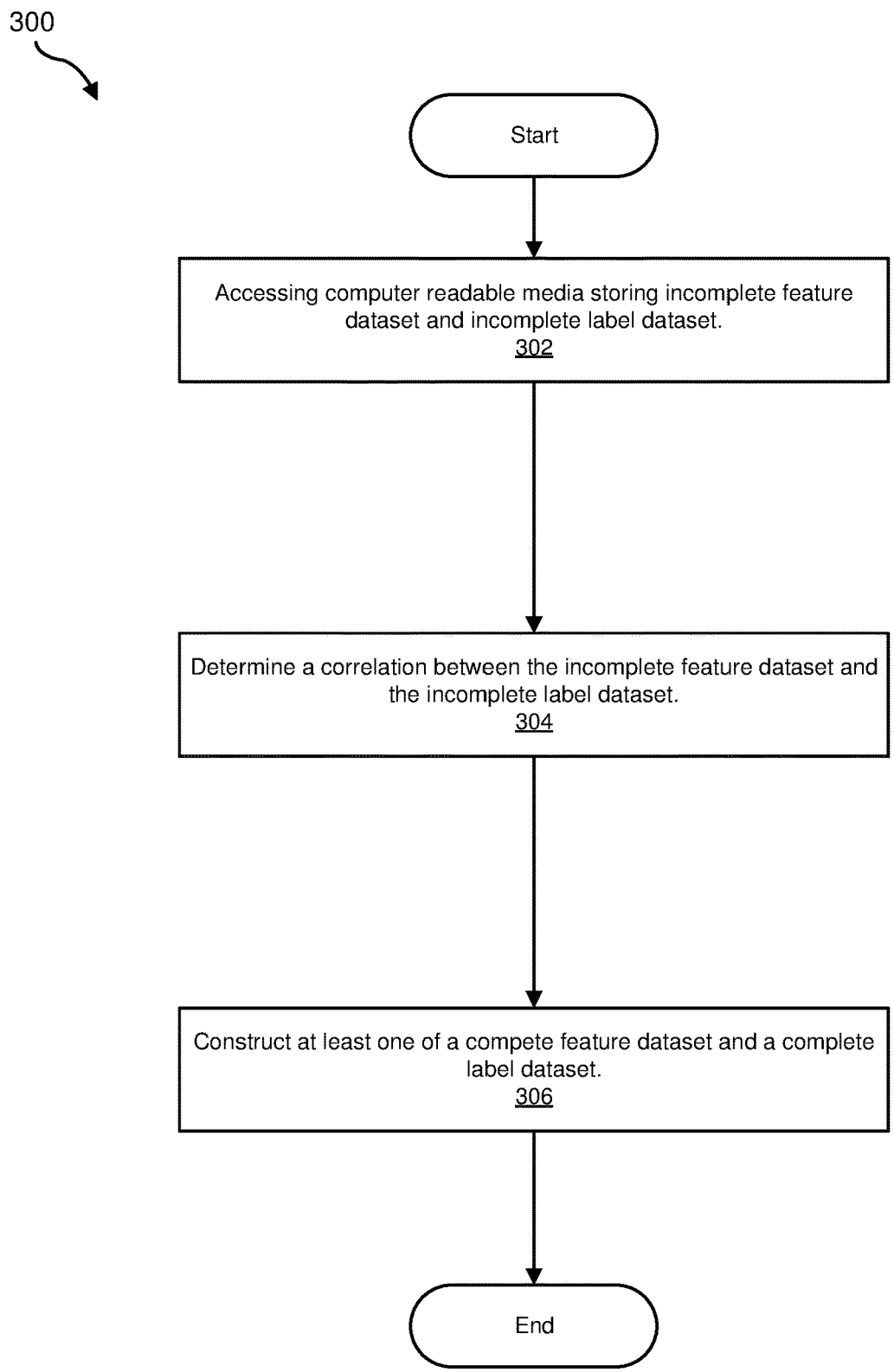
FIG. 3 is a flow diagram of an example method for cross-product malware categorization.

FIG. 3 is a flow diagram of an example computer-implemented method 300 for cross-product malware categorization. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may access computer readable storage media storing an incomplete feature dataset and an incomplete label dataset. For example, data access module 104 may, as part of computing device 202 in FIG. 2 may access storage media 220 storing label dataset 122 and feature dataset 124, or may access storage media 120 storing label dataset 122 and feature dataset 124 over network 204. Or, in another example, label dataset 122 may be stored locally at storage media 220 and feature dataset 124 may be stored remotely at server 206 in storage media 120.

The systems described herein may perform step 302 in a variety of ways. In one example, computing device 202 may access local storage media 220 to obtain feature dataset 124 and label dataset 122. Or computing device 202 may access storage media 120 at server to obtain feature dataset and label dataset. In some examples, feature dataset 124 and label dataset 122 may be stored at separate locations and computing device 202 may access more than one storage media to obtain the feature dataset and the label dataset.

At step 304 one or more of the systems described herein may determine a correlation between the incomplete feature dataset and the incomplete label dataset. For example, correlation module 106 may, as part of computing device 202 in FIG. 2, determine a correlation between label dataset 122 and feature dataset 124. In some examples, the correlation may be performed locally by physical processor 130 of computing device 120. In other examples, server 206 may determine the correlation for computing device 202 and return the results to computing device 202. An expanded description of the determination of the correlation will be described in relation to FIGS. 5 and 6.

At step 306, one or more of the systems described herein may construct at least one of a complete feature dataset and a complete label dataset. For example, dataset construction module 108 may, as part of computing device 202 in FIG. 2, construct a complete dataset using the partial feature dataset, the partial label dataset, and the correlation determined at step 304.

FIG. 4 illustrates a feature dataset 124 characterized as a matrix 400 having rows 402 corresponding to possible malware files and columns 404 corresponding to features of the possible malware files. Matrix 400 includes rows 1 through N corresponding to N different files. Matrix 400 further includes columns 1 through M corresponding to M different features. In FIG. 4, a "1" denotes that the file corresponding to the row has the feature in the corresponding column, a "0" denotes that the file corresponding to the row does not have the feature in the corresponding column, and a "–" denotes that it is not known whether the file corresponding to the row has the feature in the corresponding column. As can be seen in FIG. 4, there is at least one file where at least one feature is not known whether it corresponds to the file. Thus, the feature dataset 124 is incomplete.

Feature dataset may be constructed through analysis of the possible malware files by one or more malware analysis programs. For example, a malware detection program may analyze the binary code of the possible malware file to find N-gram patterns and/or may execute the possible malware file to find telemetry features and identify called functions. Because such testing may be expensive, either computationally or monetarily, the feature dataset may be incomplete.

Figure 5:
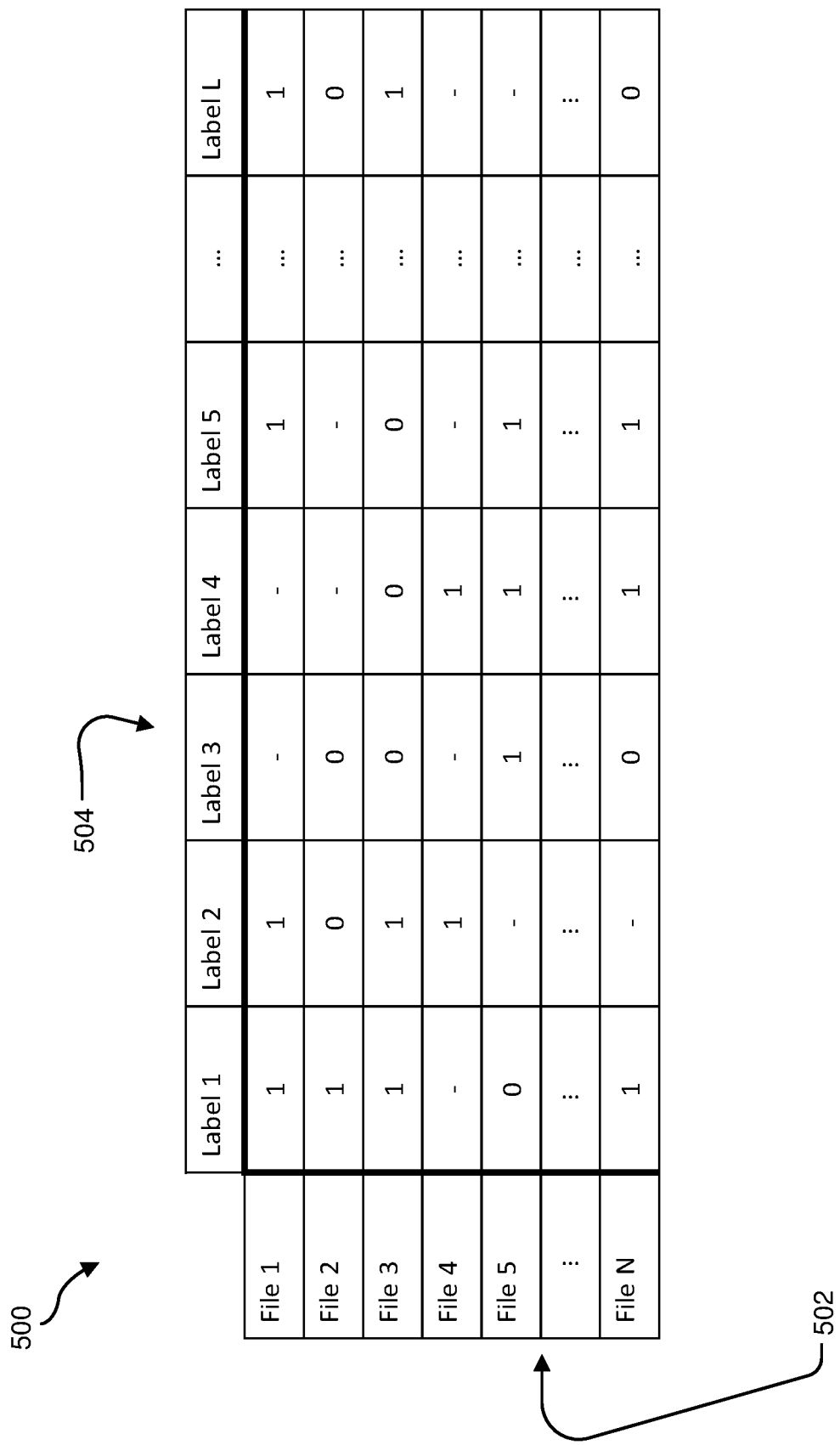
FIG. 5 is an example of a label dataset characterized as a matrix.

FIG. 5 illustrates a label dataset 122 characterized as a matrix 500. In the example of FIG. 5, matrix 500 includes rows 502 corresponding to possible malware files and columns 504 corresponding to labels of the possible malware files. Matrix 500 includes rows 1 through N corresponding to N different files. Matrix 500 further includes columns 1 through L corresponding to different labels. In FIG. 5, a "1" denotes that the file corresponding to the row has the label in the corresponding column, a "0" denotes that the file corresponding to the row does not have the label in the corresponding column, and a "–" denotes that it is not known whether the file corresponding to the row has the label in the corresponding column. As can be seen in FIG. 5, there is at least one file where at least one label is not known whether it corresponds to the file. Thus, the label dataset 122 is incomplete.

Label dataset may be constructed by recording the results of existing malware detection programs analysis of the possible malware files. For example, each possible malware file may be tested using a malware detection program and the result recorded as a label. Each existing malware detection program may generate its own label identifying the result of the test. In some examples, a malware detection program may return more than one label. For example, a single malware detection program may return labels identifying that a virus is detected, a label that a file is a potential virus, and a label indicated the file is safe. Each label may be characterized as a column in the label matrix.

Figure 6:
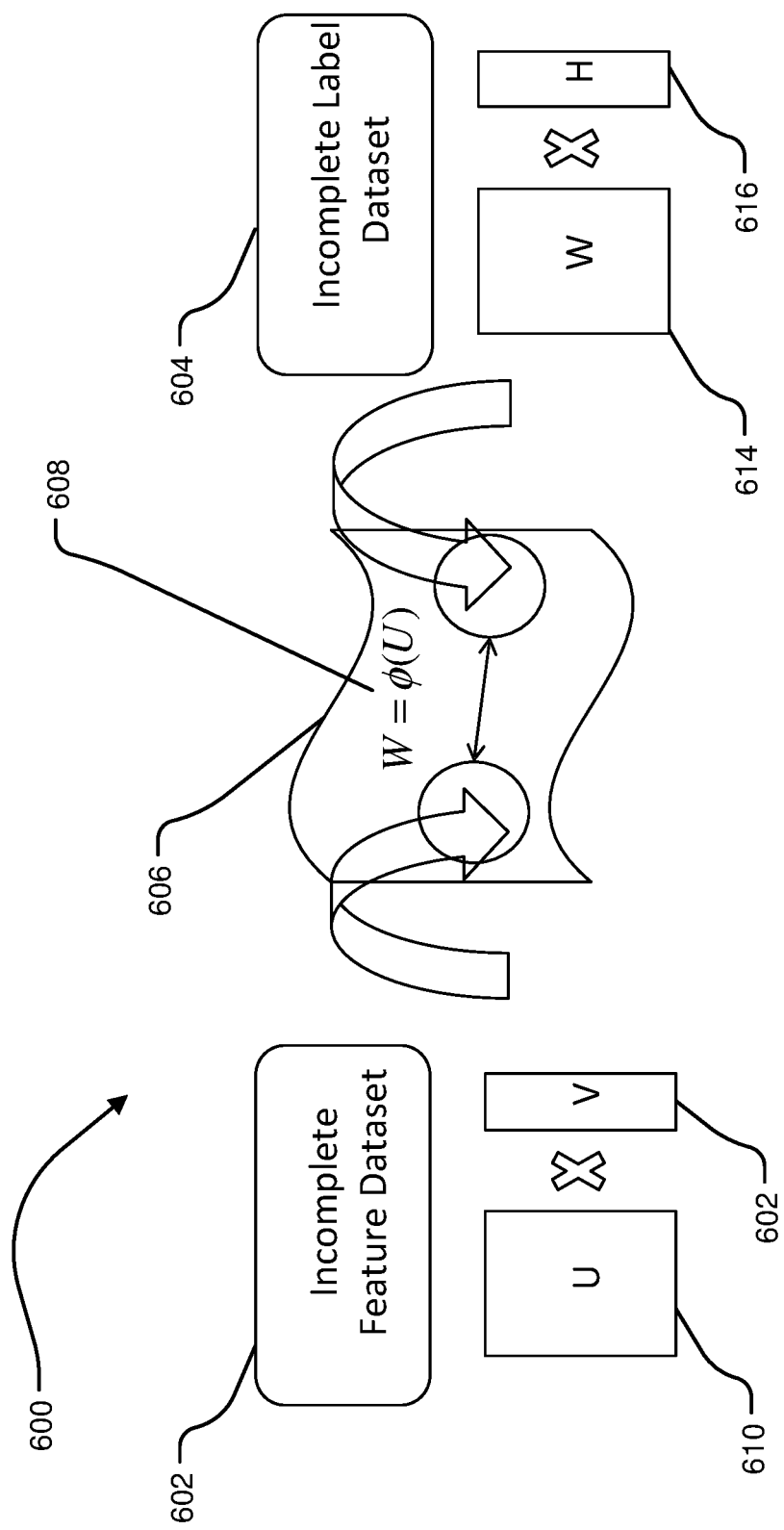
FIG. 6 is block diagram of a method for determining a correlation between an incomplete feature matrix and an incomplete label matrix.

FIG. 6 is a high-level diagram of an example of a method 600 for determining a correlation between an incomplete feature dataset 602 and an incomplete label dataset 604. The method described in relation to FIG. 6 may be performed by any suitable computer-executable code and/or computing system, including system 100 in FIG. 1, system 200 in FIG. 2, and/or variations or combinations of one or more of the same. In one example, the described method may represent an algorithm whose structure includes and/or is represented by multiple sub-steps, examples of which will be provided in greater detail below. In some examples, method 600 may be performed by correlation module 106.

Method 600 recognizes that incomplete feature dataset 602 and incomplete label dataset 604 have a shared embedding space 606. With incomplete feature dataset 602 characterized as feature matrix 400, incomplete feature dataset 602 may be projected into shared embedding space 606 using a low-rank matrix factorization over the feature matrix 400 to derive a low-dimensional linear projection 610 of the original M-dimensional features. In some examples, the low-rank matrix factorization may correspond to a least squares estimate. In one example, a low rank matrix factorization of the feature matrix may be characterized as:

$$U^*, V^* = \underset{U,V}{\operatorname{argmin}} \|\Omega_x * (X - UV^T)\|^2$$

where X is the feature matrix 400, U is the low-dimensional linear projection 610 of features of the data instances, and V is a spanning basis 612 defining the projection subspace.

With incomplete label dataset 604 characterized as label matrix 500, incomplete label dataset 604 may be projected into shared embedding space 606 using a cost-sensitive matrix factorization over label matrix 500 to derive a low-dimensional linear projection 614 of the original L-dimensional labels. The cost-sensitive matrix factorization puts less weight over unlabeled entries in label matrix 500 and suppress the impact of unlabeled entries. In one example, a cost-sensitive matrix factorization may be characterized as:

$$W^*, H^* = \underset{U,V}{\operatorname{argmin}} \ R(W, H, \alpha) + \frac{\lambda_Y}{2}(\|W\|^2 + \|H\|^2)$$

$$R(W, H, \alpha) = \alpha \sum_{i,j,Y_{i,j}=0} \log\!\left(1 + e^{-W_{i,:} H_{j,:}^T}\right) + (1-\alpha) \sum_{i,j,Y_{i,j}=0} \log\!\left(1 + e^{-W_{i,:} H_{j,:}^T}\right)$$

Where Y is the incomplete label matrix, W is the low-dimensional linear projection 614 of the labels of the data instances, and H is a spanning basis 616 defining the projection subspace.

In one example, correlation module 106 may enforce a discriminative constraint to highlight correlation between the low-dimensional linear projection 610 of the features and the low-dimensional linear projection 614 of the labels. Shared embedding space 606 has a mapping function 608 mapping the low-dimensional linear projection 610 of the original M-dimensional features to the low-dimensional linear projection 614 of the original L-dimensional labels. Mapping function 608 may be approximated using linear regressors, random forest regressors, neural networks, etc. In one example, mapping function 608 may be characterized as:

$$\min_S \left( \|US^T - W\|^2 + \frac{\lambda_S}{2} \|S\|^2 \right)$$

Where U is the projected features 610 of the data instances, W is the projected labels 614 of the data instances, and S a transformation matrix mapping the projected labels 614 to the projected features 610.

With functions defined for the feature projection, the label projection, and correlation of the feature projection and the label projection, a loss function may be defined to jointly optimize the projections and the mapping function. In one example, a loss function may be characterized as:

$$U^*, V^*, W^*, H^*,$$
$$S^* = \underset{U,V,W,H,S}{\operatorname{argmin}} \|\Omega_x * (X - UV^T)\|^2 + \lambda R(W, H, \alpha) + \lambda_{reg}\|US^T - W\|^2 +$$
$$\lambda_X(\|U\|^2 + \|V\|^2) + \lambda_Y(\|W\|^2 + \|H\|^2) + \lambda_S\|S\|^2$$

Minimizing the loss function results in optimized results for U*, V*, W*, H*, and S*.

The optimal U and V may then be used to reconstruct a complete feature matrix and the optimal W and H may be used to reconstruct a complete label matrix. In some examples, dataset construction module 108 may reconstruct the complete feature matrix and the complete label matrix. Additionally, the optimal mapping function may be further implemented as a label model for labeling possible malware files based on features of the possible malware file. In some examples, label model derivation module 110 may generate a mapping model based on the optimal mapping function. Labeling module 112 may then use mapping model to label possible malware files.

In some examples, a computer-executable code and/or computing system, including system 100 in FIG. 1, system 200 in FIG. 2, and/or variations or combinations of one or more of the same may perform a security action based on the results of the label of the possible malware file. In some examples, the security action may be at least one of cleaning the possible malware file to remove suspicious code, deleting the possible malware file to remove it from the system, and quarantining the possible malware file to isolate it.

Figure 7:
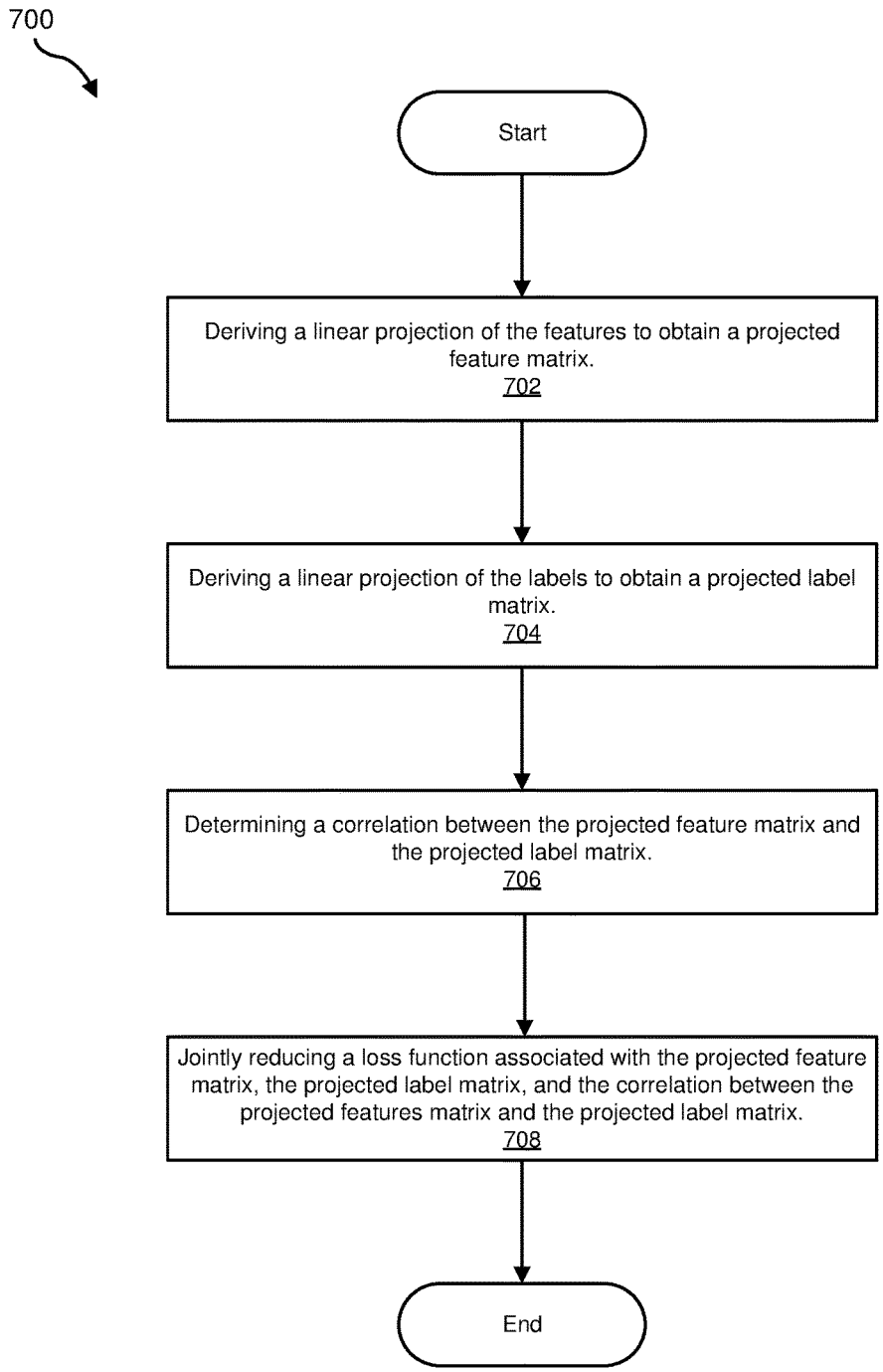
FIG. 7 is flow diagram of an example method for determining a correlation between an incomplete feature matrix and an incomplete label matrix.

FIG. 7 is a flow diagram of an example computer-implemented method 700 for determining correlation between an incomplete feature dataset characterized as a feature matrix, such as feature matrix 400, and an incomplete label dataset characterized as a label matrix, such as label matrix 500. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 7 may represent an algorithm whose structure includes and/or is represented by multiple sub-steps, examples of which will be provided in greater detail below.

As illustrated in FIG. 7, at step 702 one or more of the systems described herein may derive a linear projection of the feature matrix to obtain a projected feature matrix. For example, correlation module 104 may, as part of computing device 202 in FIG. 2 may perform a matrix factorization of feature matrix 400 to obtain a projected feature matrix and a spanning basis defining a projection subspace.

At step 704 one or more of the systems described herein may derive a linear projection of the feature matrix to obtain a projected feature matrix. For example, correlation module 104 may, as part of computing device 202 in FIG. 2 may perform a matrix factorization of label matrix 500 to obtain a projected label matrix and a spanning basis defining a projection subspace.

At step 706, one or more of the systems described herein may determine a correlation between the projected feature matrix and the projected label matrix. For example, correlation module 104 may, as part of computing device 202 in FIG. 2, determine a correlation between the projected label matrix and the projected feature matrix. In some examples, correlation module 104 may determine a correlation using a mapping function 608 approximated using linear regressors, random forest regressors, neural networks, etc.

At step 708, one or more of the systems described herein may jointly reduce a loss function associated with the projected feature matrix, the projected label matrix, and the correlation between the projected features matrix and the projected label matrix. For example, correlation module 104 may, as part of computing device 202 in FIG. 2, may define a loss function and find a solution to the projected feature matrix, projected label matrix, and correlation between the projected feature matrix and the projected label matrix to minimize the loss function.

The disclosed subject matter may be used to predict previously unlabeled features of possible malware files and to label previously unlabeled possible malware files. Using embodiments of the disclosed subject matter, a computing system may build a malware labeling model using incomplete features and partially observed file class labels. Additionally, embodiments of the disclosed subject matter, may predict the labeling output of a given anti-malware product without accessing all features of the given file. The decision rules, as characterized by the mapping function, may be transferred across different anti-malware products for increased accuracy in identifying potential malware.

In some examples, storage media may store a dataset containing incomplete features of possible malware files and a dataset containing incomplete labels of the possible malware files. The sources of the dataset may be historical monitoring of files and past results of differing antimalware products. A computing device accesses the storage media to load the datasets. The computing device then determines a correlation between the two datasets. The correlation, which may be a mapping function, may then be used to rebuild the datasets with an accurate prediction of the missing features and the missing labels. Additionally, the correlation may be used as a model for predicting labels of future possible malware files.

Figure 8:
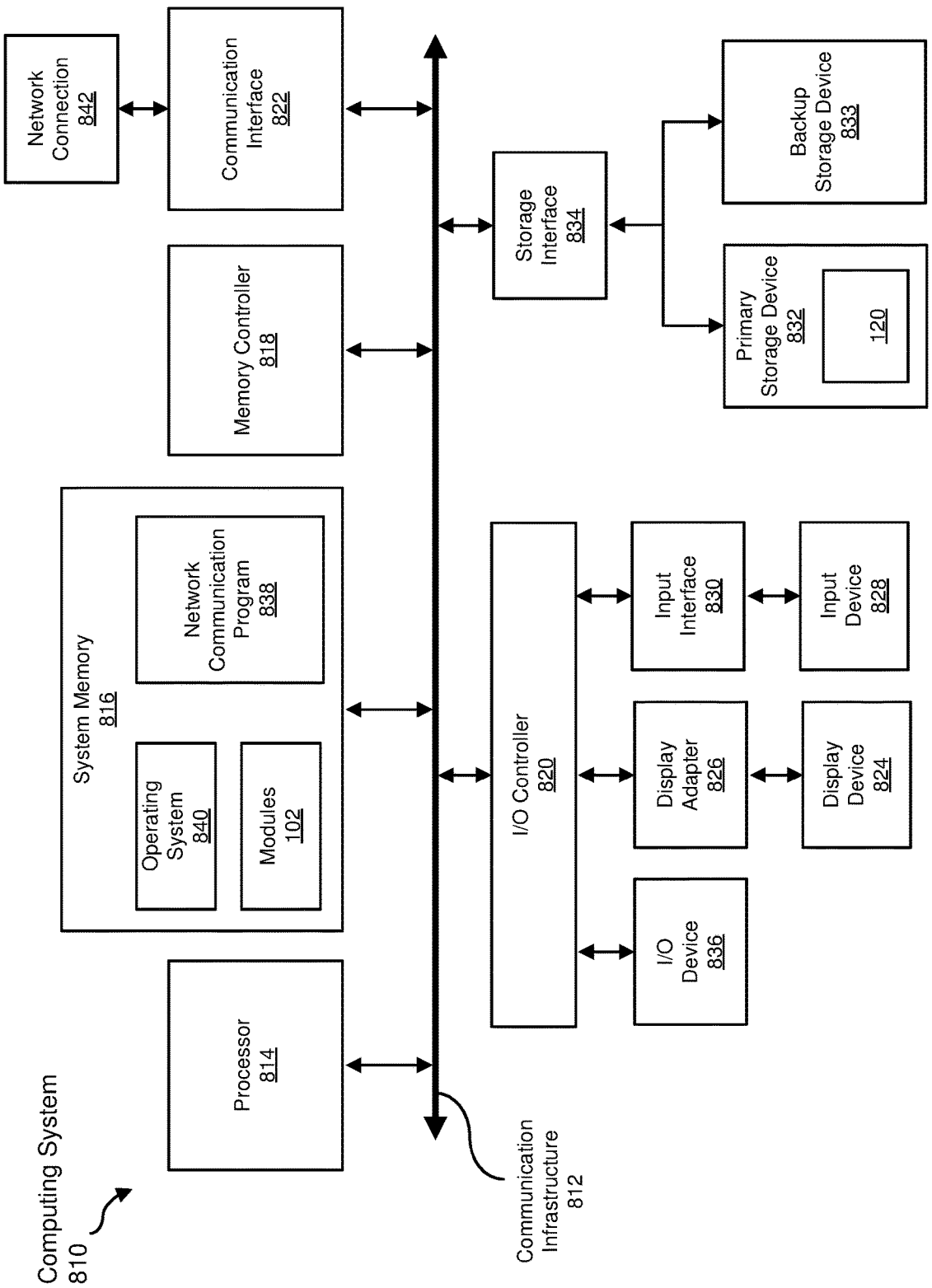
FIG. 8 is a block diagram of an example computing system capable of implementing one or more of the embodiments described and/or illustrated herein.

FIG. 8 is a block diagram of an example computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the example embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In some examples, system memory 816 may store and/or load an operating system 840 for execution by processor 814. In one example, operating system 840 may include and/or represent software that manages computer hardware and software resources and/or provides common services to computer programs and/or applications on computing system 810. Examples of operating system 840 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

As illustrated in FIG. 8, computing system 810 may also include at least one display device 824 coupled to I/O controller 820 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, example computing system 810 may also include at least one input device 828 coupled to I/O controller 820 via an input interface 830. Input device 828 generally represents any type or form of input device capable of providing input, either computer or human generated, to example computing system 810. Examples of input device 828 include, without limitation, a keyboard, a pointing device, a speech recognition device, variations or combinations of one or more of the same, and/or any other input device.

Additionally or alternatively, example computing system 810 may include additional I/O devices. For example, example computing system 810 may include I/O device 836. In this example, I/O device 836 may include and/or represent a user interface that facilitates human interaction with computing system 810. Examples of I/O device 836 include, without limitation, a computer mouse, a keyboard, a monitor, a printer, a modem, a camera, a scanner, a microphone, a touchscreen device, variations or combinations of one or more of the same, and/or any other I/O device.

Communication interface 822 broadly represents any type or form of communication device or adapter capable of facilitating communication between example computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

In some examples, system memory 816 may store and/or load a network communication program 838 for execution by processor 814. In one example, network communication program 838 may include and/or represent software that enables computing system 810 to establish a network connection 842 with another computing system (not illustrated in FIG. 8) and/or communicate with the other computing system by way of communication interface 822. In this example, network communication program 838 may direct the flow of outgoing traffic that is sent to the other computing system via network connection 842. Additionally or alternatively, network communication program 838 may direct the processing of incoming traffic that is received from the other computing system via network connection 842 in connection with processor 814.

Although not illustrated in this way in FIG. 8, network communication program 838 may alternatively be stored and/or loaded in communication interface 822. For example, network communication program 838 may include and/or represent at least a portion of software and/or firmware that is executed by a processor and/or Application Specific Integrated Circuit (ASIC) incorporated in communication interface 822.

As illustrated in FIG. 8, example computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, data store 120 from FIG. 1 may be stored and/or loaded in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 810 may be configured as an Application Specific Integrated Circuit (ASIC) adapted to implement one or more of the example embodiments disclosed herein.

Figure 9:
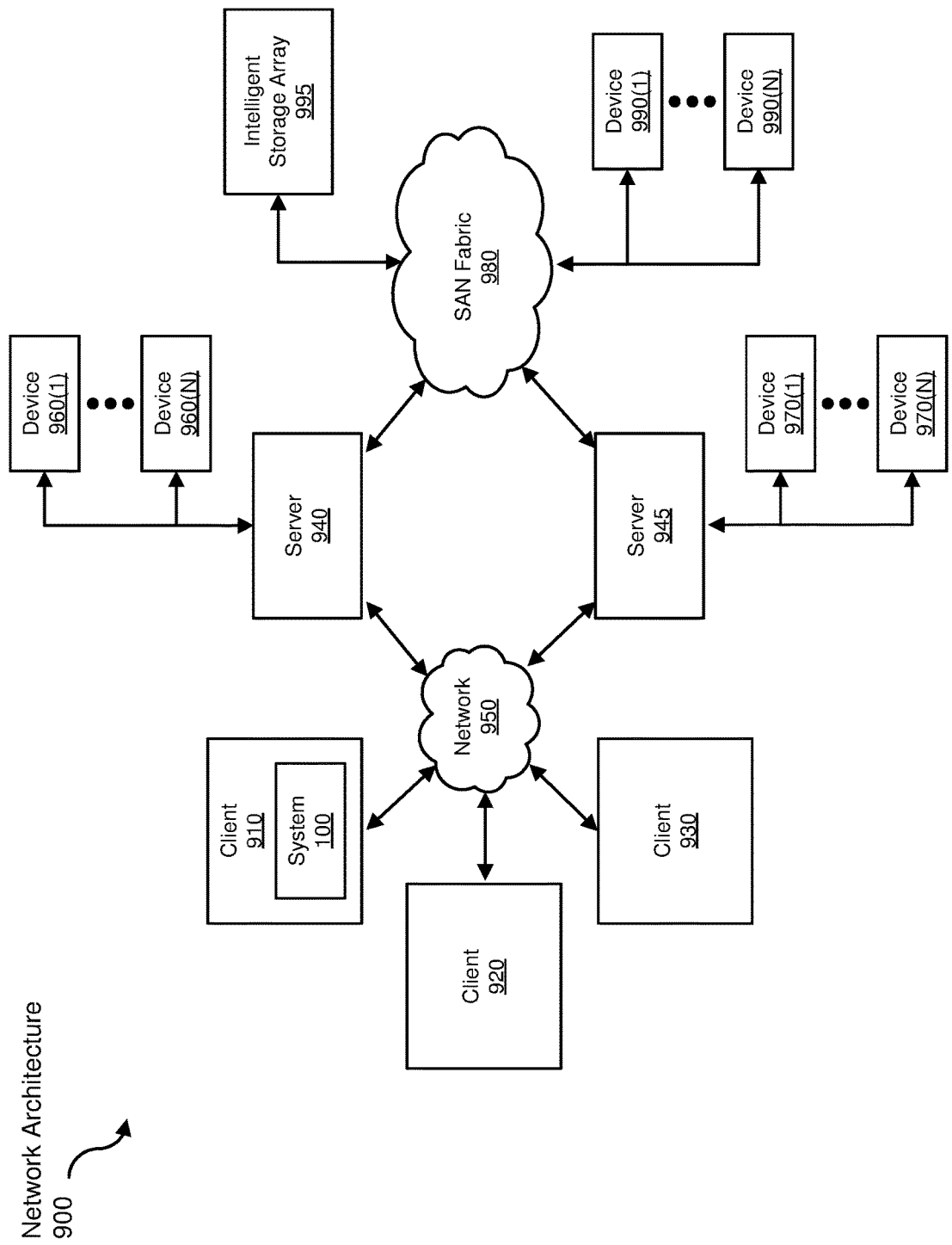
FIG. 9 is a block diagram of an example computing network capable of implementing one or more of the embodiments described and/or illustrated herein.

FIG. 9 is a block diagram of an example network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as example computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to example computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the example embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an example method for cross-product malware categorization.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive incomplete feature datasets and incomplete label datasets to be transformed, transform the datasets to complete datasets, output a result of the transformation to a classifier for classifying possible malware, use the result of the transformation to classify possible malware, and store the result of the transformation to persistent storage. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for cross-product malware categorization, at least a portion of the method being performed by one or more computing devices comprising at least one processor, the method comprising:

accessing, by the one or more computing devices, computer readable media storing an incomplete feature dataset and an incomplete label dataset, the incomplete feature dataset comprising a plurality of features corresponding to a plurality of possible malware files and the label dataset comprising a plurality of malware labels corresponding to the plurality of possible malware files;

determining, by the one or more computing devices, a correlation between the plurality of features and the plurality of malware labels;

constructing, by the one or more computing devices, at least one of a complete feature dataset based on the incomplete feature dataset and the correlation and a complete label dataset based on the incomplete label dataset and the correlation, wherein the incomplete feature dataset is characterized as a feature matrix of N by M dimensions, the N dimension representing files and the M dimension representing features of the files, and wherein the incomplete label dataset is characterized as a label matrix of N by L dimensions, the L dimension representing the malware labels;

deriving, by the one or more computing devices, a linear projection of the M dimensional features to obtain a projected feature matrix; and deriving, by the one or more computing devices, a linear projection of the L dimensional labels to obtain a projected label matrix;

wherein the correlation between the plurality of features and the plurality of malware labels comprises a correlation between the projected feature matrix and the projected label matrix.

2. The computer implemented method of claim 1, further comprising:

jointly reducing, by the one or more computing devices, a loss function associated with the projected feature matrix, the projected label matrix, and the correlation between the projected features matrix and the projected label matrix.

3. The computer implemented method of claim 1, further comprising:
performing, by the one or more computing devices, a low-rank matrix factorization of the feature matrix to derive the linear projection of the M dimensional features.

4. The computer implemented method of claim 1, further comprising:
performing, by the one or more computing devices, a low-rank matrix factorization of the label matrix to derive the linear projection of the L dimensional labels.

5. The computer implemented method of claim 4, wherein the matrix factorization is a cost sensitive matrix factorization suppressing an impact of unlabeled entries in the label matrix.

6. The computer implemented method of claim 1, further comprising:
enforcing, by the one or more computing devices, a discriminative constraint to determine the correlation between the projected feature matrix and the projected label matrix.

7. The computer implemented method of claim 6, further comprising:
approximating, by the one or more computing devices, a functional mapping between the projected feature matrix and the projected label matrix using linear regressors, random forest regressors, or neural networks.

8. The computer implemented method of claim 1, further comprising:
deriving, by the one or more computing devices, a labeling model based on the correlation between the projected feature matrix and the projected label matrix, the labeling model configured to label new possible malware files.

9. The computer implemented method of claim 8, further comprising:
receiving, by the one or more computing devices, a set of features of a possible malware file and labeling the possible malware file with the labeling model, to generate a labeled possible malware file.

10. The computer implemented method of claim 9, further comprising:
performing, by the one or more computing devices, a security action to protect the one or more computing devices from the labeled possible malware file.

11. The computer implemented method of claim 10, wherein the security action comprises one or more of:
cleaning the possible malware file;
deleting the possible malware file; and
quarantining the possible malware file.

12. A non-transitory computer-readable medium comprising one or more computer-executable instructions that, when executed by at least one processor of a one or more computing devices, cause the one or more computing devices to:
access computer readable media storing an incomplete feature dataset and an incomplete label dataset, the incomplete feature dataset comprising a plurality of features corresponding to a plurality of possible malware files and the label dataset comprising a plurality of malware labels corresponding to the plurality of possible malware files;
determine a correlation between the plurality of features and the plurality of malware labels;

construct a complete feature dataset based on the feature dataset and the correlation, wherein the incomplete feature dataset is characterized as a feature matrix of N by M dimensions, the N dimension representing files and the M dimension representing features of the files, and wherein the incomplete label dataset is characterized as a label matrix of N by L dimensions, the L dimension representing the malware labels;
derive a linear projection of the M dimensional features to obtain a projected feature matrix; and
derive a linear projection of the L dimensional labels to obtain a projected label matrix;
wherein the correlation between the plurality of features and the plurality of malware labels comprises a correlation between the projected feature matrix and the projected label matrix.

13. The non-transitory computer-readable medium of claim 12, wherein the one or more computer-executable instruction further cause the one or more computing devices to:
derive a labeling model based on the correlation between the projected feature matrix and the projected label matrix, the labeling model configured to label new possible malware files.

14. The non-transitory computer-readable medium of claim 13, wherein the one or more computer-executable instruction further cause the one or more computing devices to:
receive a set of features of a possible malware file and label the possible malware file with the labeling model, to generate a labeled possible malware file.

15. The non-transitory computer-readable medium of claim 14, wherein the one or more computer-executable instruction further cause the one or more computing devices to:
perform a security action to protect the one or more computing devices from the labeled possible malware file.

16. The non-transitory computer-readable medium of claim 15, wherein the security action comprises one or more of:
cleaning the possible malware file;
deleting the possible malware file; and
quarantining the possible malware file.

17. The non-transitory computer-readable medium of claim 12, wherein the one or more computer-executable instruction further cause the one or more computing devices to:
jointly reduce a loss function associated with the projected feature matrix, the projected label matrix, and the correlation between the projected features matrix and the projected label matrix.

18. A system for cross-product malware categorization, the system comprising:
one or more computing devices comprising at least one processor; and
computer readable media storing an incomplete feature dataset and an incomplete label dataset, the incomplete feature dataset comprising a plurality of features corresponding to a plurality of possible malware files and the label dataset comprising a plurality of malware labels corresponding to the plurality of possible malware files, the computer readable media having instructions stored thereon that when performed by the at least one processor cause the one or more computing devices to:

determine a correlation between the plurality of features and the plurality of labels;

construct a complete feature dataset based on the feature dataset and the correlation, wherein the incomplete feature dataset is characterized as a feature matrix of N by M dimensions, the N dimension representing files and the M dimension representing features of the files, and wherein the incomplete label dataset is characterized as a label matrix of N by L dimensions, the L dimension representing the malware labels;

derive a linear projection of the M dimensional features to obtain a projected feature matrix; and derive a linear projection of the L dimensional labels to obtain a projected label matrix;

wherein the correlation between the plurality of features and the plurality of malware labels comprises a correlation between the projected feature matrix and the projected label matrix.

19. The system for cross-product malware categorization of claim 18, wherein the instructions further cause the one or more computing devices to:

derive a labeling model based on the correlation between the projected feature matrix and the projected label matrix, the labeling model configured to label new possible malware files; and label the possible malware file with the labeling model based on a set of features of the possible malware file.

20. The system for cross-product malware categorization of claim 18, wherein the instructions further cause the one or more computing devices to:

jointly reduce a loss function associated with the projected feature matrix, the projected label matrix, and the correlation between the projected features matrix and the projected label matrix.

\* \* \* \* \*